(12) United States Patent
Deville

(10) Patent No.: US 12,241,015 B2
(45) Date of Patent: Mar. 4, 2025

(54) OPEN-CELL, NATURAL MATERIALS AS LOST-CIRCULATION MATERIAL

(71) Applicant: Halliburton Energy Services, Inc., Houston, TX (US)

(72) Inventor: Jay Deville, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/658,858

(22) Filed: Apr. 12, 2022

(65) Prior Publication Data
US 2023/0323182 A1    Oct. 12, 2023

(51) Int. Cl.
*C09K 8/035* (2006.01)
*C09K 8/40* (2006.01)
*C09K 8/42* (2006.01)
*C09K 8/60* (2006.01)

(52) U.S. Cl.
CPC ............ *C09K 8/035* (2013.01); *C09K 8/40* (2013.01); *C09K 8/42* (2013.01); *C09K 8/60* (2013.01)

(58) Field of Classification Search
CPC . C09K 8/035; C09K 8/40; C09K 8/42; C09K 8/60
See application file for complete search history.

(56) References Cited

U.S. PATENT DOCUMENTS

| 7,297,663 | B1* | 11/2007 | Kilchrist | C09K 8/5083 |
| | | | | 507/269 |
| 2006/0094604 | A1 | 5/2006 | Fang et al. | |
| 2007/0187099 | A1 | 8/2007 | Wang | |
| 2012/0192768 | A1* | 8/2012 | Ravi | |
| 2015/0292278 | A1 | 10/2015 | Wang | |
| 2016/0215593 | A1* | 7/2016 | Savari | E21B 41/0092 |
| 2019/0375974 | A1 | 12/2019 | Ramasamy et al. | |
| 2021/0009881 | A1* | 1/2021 | Jamison | |

FOREIGN PATENT DOCUMENTS

WO    2015035520 A1    3/2015

OTHER PUBLICATIONS

Ngata (Review of developments in nanotechnology application for formation damage control, Energy & Fuels 2022, 36, 80-97).*

* cited by examiner

*Primary Examiner* — Kumar R Bhushan
(74) *Attorney, Agent, or Firm* — Sheri Higgins Law, PLLC; Sheri Higgins

(57) ABSTRACT

A treatment fluid can include a base fluid and a lost-circulation package. The lost-circulation package can include plurality of pieces of a first lost-circulation material and a second lost-circulation material. The plurality of pieces can be an open-cell, natural or biodegradable material, for example natural sponges such as loofah. The plurality of pieces can enter permeable areas of a subterranean formation and form a mesh-like matrix that the second lost-circulation material can be retained within. The second lost-circulation material can be insoluble particles such as ground walnut shells or include ingredients that form a cementitious substance. The first and second lost-circulation materials can form a plug and provide adequate fluid loss control. The treatment fluid can be used in an oil and gas operation.

19 Claims, 4 Drawing Sheets

OPEN-CELL, NATURAL MATERIALS AS LOST-CIRCULATION MATERIAL

TECHNICAL FIELD

Wellbore treatment operations can involve pumping a treatment fluid into a wellbore. The treatment fluid generally includes a liquid as the base fluid. During introduction into the wellbore, some of the base fluid can be lost into a subterranean formation that is penetrated by the wellbore. Improved lost-circulation materials can be used to reduce the amount of base fluid that is lost.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
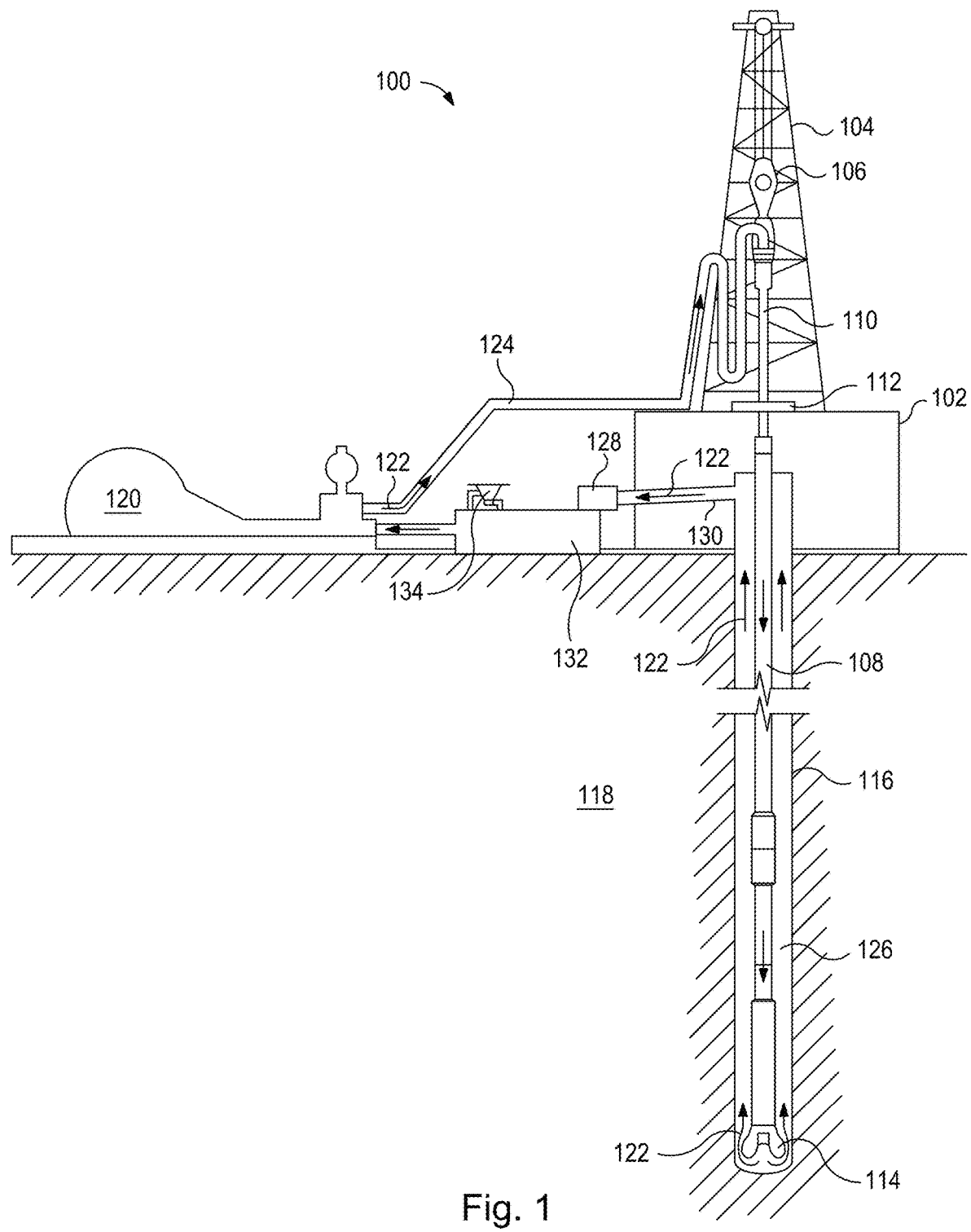
FIG. 1 illustrates a system for introducing a treatment fluid into a wellbore.

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

Oil or gas operations can be performed using a treatment fluid. The term "treatment fluid" refers to the specific composition of the fluid as it is being introduced into a well. The word "treatment" in the term "treatment fluid" does not necessarily imply any particular action by the fluid. Examples of treatment fluids include, but are not limited to, drilling fluids, spacer fluids, workover fluids, cement compositions, and stimulation fluids.

During drilling operations, a wellbore is formed using a drill bit. A drill string can be used to aid the drill bit in drilling through a subterranean formation to form the wellbore. The drill string can include a drilling pipe. A treatment fluid adapted for this purpose is referred to as a drilling fluid or drilling mud. The wellbore defines a wellbore wall that is the exposed portion of the subterranean formation where the wellbore was formed. The drilling fluid may be circulated downwardly through the drilling pipe and back up the annulus between the wellbore wall and the outside of the drilling pipe.

After a wellbore is formed, it may be desirable to perform a cementing operation. A treatment fluid called a spacer fluid can be introduced into the wellbore after the drilling fluid and before the cement composition. The spacer fluid can flush residual drilling fluid that may remain in parts of the wellbore or face of the subterranean formation to help ensure better bonding of the cement composition to the interface. Other types of oil or gas operations, for example, completion or workover operations can also be performed with a treatment fluid.

The wellbore wall and near-wellbore region of the subterranean formation can include permeable areas. Examples of permeable areas include cracks, natural fissures, fractures, vugs, interconnected pores, or induced fractures. Cracks, fissures, and fractures can generally be characterized as having a length greater than its diameter. Vugs and holes can be characterized as being any cavity having a variety of shapes and sizes. Porosity refers to the number of individual pores within an area of the subterranean formation. Permeability and all grammatical variations thereof, in this context, refers to the amount of interconnectivity between the individual pores that allows fluid to migrate or move between the interconnected pores. Permeable areas in the wall of the wellbore and near-wellbore region can vary and have dimensions ranging from 0.1 micrometers and as large as 50 micrometers or larger. As used herein, a "permeable area" means any area where fluid can flow into the subterranean formation via a wellbore and can be caused by— without limitation—cracks, fissures, fractures, cavities, and interconnected pores.

Some of the base fluid of a treatment fluid can undesirably flow into the subterranean formation via the permeable areas instead of remaining in the wellbore and being circulated back up to the wellhead. This is known as lost circulation. In order to overcome the problems associated with lost circulation, a lost-circulation material ("LCM") can be used. As the treatment fluid is placed into the well, the LCM can eliminate or lessen the amount of liquid base fluid entering the subterranean formation.

Common LCM can include insoluble particulates, such as walnut shells. The insoluble particulates of the LCM can build upon each other and form a bridge over or within the permeable areas of the subterranean formation. The bridge can eliminate or reduce the amount of liquid base fluid entering the subterranean formation via the wellbore. Other lost-circulation materials can be used that form a filtercake to reduce or stop fluid loss. A filtercake is the residue deposited on a permeable medium when a slurry, such as a drilling fluid, is forced against the medium under pressure. The filtrate is the liquid that passes through the medium, leaving the cake on the medium. In filtercake deposition, the slurry, that commonly includes cementitious materials including water, a gelling agent, calcium carbonate, diatomaceous earth, and/or polymers, is introduced into the open-hole wellbore. The fluid flows into a desired portion of the well. The ingredients in the fluid form the filtercake. The filtercake can be used to bind fines, such as sand, together, and prevent fluid loss into the subterranean formation.

Environmental regulations can limit which ingredients can be used in oil or gas operations. Environmental regulations can be different, for example, for on-shore versus off-shore operations and for different regions around the world. OSPAR, which is a cooperative agreement between multiple countries that protects the marine environment in the North-East Atlantic Ocean, has created a list of chemicals that the OSPAR commission considers to pose little or no risk to the environment—commonly called the PLONOR list. However, many lost-circulation materials are not included on the PLONOR list. Thus, there is a need for new lost-circulation materials that can be used to treat lost circulation that comply with environmental regulations.

Materials that are biodegradable can also be used to satisfy environmental regulations. Inherent biodegradability refers to tests, which allow prolonged exposure of the test substance to microorganisms. As used herein, a material with a biodegradation rate of >20% is regarded as "inherently primary biodegradable." A material with a biodegradation rate of >70% is regarded as "inherently ultimate biodegradable." A material can be considered "biodegradable" if the material is either, regarded as inherently primary biodegradable or inherently ultimate biodegradable.

It has been discovered that a lost-circulation package can include a first LCM made of pieces of open-cell, natural or biodegradable materials and a second LCM. The first LCM can form a matrix within permeable areas of the subterranean formation upon which the second LCM can embed within and decrease or prevent undesirable fluid loss into the formation. As used herein, the term "open cell" means a substance possessing a sufficient number of cells per unit volume that are open and wherein the open cells create interconnected pores whereby a fluid can flow through the interconnected pores. As used herein, the term "natural" means materials that are existing in or caused by nature and does not mean synthetic materials. An example of a natural material is cellulose, which is a wood product. An example of a synthetic material is polyurethane, which is created by a chemical reaction between a polyol and a diisocyanate or polymeric isocyanate and possibly other reactants.

A treatment fluid can include: a base fluid; and a lost-circulation package comprising: (i) a first lost-circulation material, wherein the first lost-circulation material is a plurality of pieces of an open-cell, natural or biodegradable substance; and (ii) a second lost-circulation material.

Methods of treating a subterranean formation can include introducing the treatment fluid into the subterranean formation and causing or allowing the lost-circulation material to reduce loss of the base fluid into permeable areas of the subterranean formation.

It is to be understood that the discussion of any of the embodiments regarding the treatment fluid or any ingredient in the treatment fluid is intended to apply to all of the method and composition embodiments without the need to repeat the various embodiments throughout. Any reference to the unit "gallons" means U.S. gallons.

The treatment fluid can be used in a variety of oil or gas operations. The treatment fluid can be, for example, a drilling fluid, a spacer fluid, a workover fluid, or a stimulation fluid.

The treatment fluid can be a colloid, an emulsion, or an invert emulsion. The treatment fluid includes a base fluid. The base fluid can include dissolved materials or undissolved solids. The base fluid can include a hydrocarbon liquid, or an internal phase of the treatment fluid can include a hydrocarbon liquid. The hydrocarbon liquid can be selected from the group consisting of a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a fractional distillate of crude oil is diesel oil. The saturated hydrocarbon can be an alkane or paraffin. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin.

The base fluid or an internal phase of the treatment fluid can comprise water. The water can be selected from the group consisting of freshwater, seawater, brine, and any combination thereof in any proportion. The treatment fluid can further include a water-soluble salt. The water-soluble salt can be selected from the group consisting of sodium chloride, calcium chloride, calcium bromide, potassium chloride, potassium bromide, magnesium chloride, and any combination thereof. The treatment fluid can contain the water-soluble salt in a concentration in the range of about 30 to about 350 pounds per barrel (ppb) (116 to 1,353 kilograms per cubic meter "$kg/m^3$") of the water.

The treatment fluid includes a lost-circulation package. The lost-circulation package includes a first lost-circulation material. The first lost-circulation material can be a plurality of pieces of an open-cell, natural or biodegradable substance. According to any of the embodiments, the substance for the first lost-circulation material is a sponge. A sponge is a porous substance that is generally formed by a framework of fibers that can absorb water and also allow some of a fluid to flow through the open cell pores. According to any of the embodiments, the substance for the first lost-circulation material can possess elastic properties. When dry, a sponge may not exhibit elastic properties and yield to compressive forces (i.e., the sponge can mostly maintain its shape when a force is applied to the outside of the sponge). However, when contacted with water, a sponge can absorb some of the water and can exhibit elastic properties and yield to compressive forces. Accordingly, when wet, a sponge can be compressed and is capable of being squeezed through tight spaces, for example in downhole tools, bit nozzles, or other wellbore components. Then after the compressive forces are removed, for example after the sponge substance is positioned within a permeable area of the subterranean formation, the sponge can return to its original size.

According to any of the embodiments, the first lost-circulation material is entirely comprised of natural or biodegradable materials. The substance for the first lost-circulation material can be a polysaccharide. Natural materials can be selected from cellulose, cellulose derivatives, hemicellulose, pectin, lignin, and combinations thereof. Biodegradable materials can be selected from biodegradable polymeric foams, such as polylactic acid (PLA), polyglycolic acid, or polyester foams, and combinations thereof. The first lost-circulation material substance can be natural loofah. Natural loofah comes from the fruit of *luffa* plants, *Luffa acutangula* and *L. aegyptiaca*. When the fruit from the *luffa* plant dries out and is peeled, its fibrous interior can be used as a sponge.

Figure 2:
FIG. 2 is a perspective view of an open-cell, natural material as the first lost-circulation material according to certain embodiments.
Figure 3:
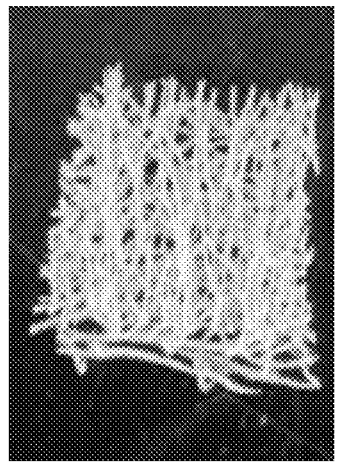
FIG. 3 is a top view of an open-cell, natural material as the first lost-circulation material according to certain other embodiments.

The plurality of pieces of the first lost-circulation material can have a variety of geometric shapes. The geometric shapes can include, but are not limited to, a sphere, a pyramid, a cube, a cylinder, a rectangular prism, a triangular prism, or a tetrahedron. FIG. 2 shows a piece of a first lost-circulation material having a generally pyramidal shape. FIG. 3 shows a piece of a first lost-circulation material having a generally cuboid shape. The plurality of pieces of the first lost-circulation material can also include combinations of different geometric shapes. The plurality of pieces of the first lost-circulation material can have a variety of dimensions. The dimensions can be, for example, height, width, length, or diameter. The plurality of pieces of the first lost-circulation material can have a largest dimension in the range of 0.1 to 2 inches. The plurality of pieces of the first lost-circulation material can also have largest dimensions that are different. By way of example, 30% of the pieces can have a largest dimension of 2 inches, 30% of the pieces can have a largest dimension of 1 inch, and 40% of the pieces can have a largest dimension of 0.5 inches.

The first lost-circulation material can be in a concentration in the range of 0.1 to 10 pounds per barrel (ppb) of the base fluid. The first lost-circulation material can be in a concentration in the range of 0.1% to 2% weight by weight (w/w %) of the second lost-circulation material.

The lost-circulation package can include a second lost-circulation material. The second lost-circulation material can be particles that are insoluble in the water of the base fluid. Examples of insoluble particles include, but are not limited to: ground coal; petroleum coke; sized calcium carbonate; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material (such as ethylene vinyl acetate); a polytetrafluoroethylene material; ground nut shells, for example walnut, almond, or pecan; ground seed shells, for example sunflower seed shells; ground fruit pits; clay; silica; alumina; fumed carbon; carbon black; graphite; mica; titanium oxide; meta-silicate; calcium silicate; kaolin; talc; zirconia; boron; fly ash; a hollow glass microsphere; fibers, such as carbon fibers, polypropylene fibers, acrylic fibers, or viscose fibers; any composite particle thereof; and any combination thereof.

According to certain other embodiments, the second lost-circulation material can include ingredients that chemically react to form a cementitious substance in the presence of water. As used herein, the term "cementitious substance" means materials other than cement (e.g., Portland cement) that possess properties of cement (i.e., developing compressive strength and becoming hard or solid). The ingredients can be, for example, diatomaceous earth, lime, silica, clay, and combinations thereof. The second lost-circulation material can also include combinations of insoluble particles and ingredients that chemically react to form a cementitious substance. According to any of the embodiments, the second lost-circulation material includes ingredients that are natural or biodegradable.

The second lost-circulation material can be in a concentration in the range of 10 to 200 ppb of the base fluid. For insoluble particles used, the second lost-circulation material can be in a concentration of 10 to 150 ppb of the base fluid. For ingredients that form a cementitious substance, the second lost-circulation material can be in a concentration in the range of 50 to 200 ppb of the base fluid.

The methods include introducing the treatment fluid into a portion of a subterranean formation. According to any of the embodiments, the first lost-circulation material and the second lost-circulation material are added to the base fluid at the same time at the wellhead to form the treatment fluid.

The first and second lost-circulation materials can be used to inhibit or prevent fluid flow from the wellbore into the formation or also from the formation into the wellbore (depending on the specific oil or gas operation being performed) via the permeable areas. It should be understood that while some of the treatment fluid may penetrate into the subterranean formation, the majority of the treatment fluid should remain in the wellbore. Moreover, as used herein, the term "penetrate" and all grammatical variations thereof is not intended to preclude some penetration of a certain depth, for example, a few inches, into the formation, but rather is meant to include penetration of depths that would be considered in the industry as lost circulation, and could likely impair oil or gas operations or increase the cost of performing the oil or gas operation.

There can be a multitude of permeable areas comprising the same or different types of voids, such as fractures, fissures, vugs, or interconnected pores. The dimensions of the permeable areas can be different. By way of example, a fracture may have a length that is greater than 50 micrometers; while pores may have dimensions greater than 10 micrometers. The lost-circulation materials may prevent or reduce fluid loss into any of the permeable areas regardless of the dimensions of the permeable areas.

After introduction of the treatment fluid into the subterranean formation, the first lost-circulation material can enter the permeable areas of the formation, for example by being compressed and squeezed into the permeable areas of the formation. The plurality of pieces of the first lost-circulation material can be adjacent to each other within the permeable areas and can form a mesh-like matrix. The plurality of pieces can enter a permeable area and begin to build upon each other at a location farther away from the wall of the wellbore first and then fill the entire permeable area, or the plurality of pieces can build upon each other at a location closer to the wall of the wellbore and not fill the entire permeable area.

The second lost-circulation material can enter the voids and pores of the first lost-circulation material. The voids and pores of the first lost-circulation material can retain some or all of the second lost-circulation material within the mesh-like matrix. If the second lost-circulation material includes ingredients that chemically react to form a cementitious substance, then the ingredients can be retained within the mesh-like matrix, the base fluid can flow through the mesh-like matrix to de-water the ingredients whereby the ingredients can react to form a cementitious substance around and within the mesh-like matrix. According to any of the embodiments, the first and second lost-circulation materials form a plug within the permeable areas of the subterranean formation.

According to any of the embodiments, the lost-circulation package provides a desired fluid loss control. For example, a desired fluid loss control can be at least 70%, 80%, or 90% by volume of the base fluid is not lost through the permeable areas of the subterranean formation. The geometric shape or combination of different geometric shapes of the plurality of pieces of the first lost-circulation material can be selected such that the first lost-circulation material forms a mesh-like matrix whereby some or all of the second lost-circulation material is retained within the mesh-like matrix and the lost-circulation package provides the desired fluid loss control. The largest dimension or combination of different dimensions of the plurality of pieces of the first lost-circulation material can be selected such that the first lost-circulation material forms a mesh-like matrix whereby some or all of the second lost-circulation material is retained within the mesh-like matrix and the lost-circulation package provides the desired fluid loss control. The concentration of the first lost-circulation material and the second lost-circulation material can also be selected such that the lost-circulation package provides the desired fluid loss control.

A test treatment fluid can be used to determine the predicted performance in an oil or gas operation and the necessary geometric shapes, dimensions, and concentrations of the lost-circulation materials. For predictive performance, a test treatment fluid forms a plug in a slot that has a width of at least 1,000 micrometers and maintains a pressure differential of at least 1,000 psi using the fracture plugging test as described in the Examples section below.

It is to be understood that while the treatment fluid can contain other ingredients, it is the first and second lost-circulation materials that are primarily or wholly responsible for providing the requisite fluid loss control. For example, and as used herein, a "test treatment fluid" consisting essentially of, or consisting of, the base fluid and the lost-circulation package that includes the first and second lost-circulation materials and in the same proportions as the treatment fluid can provide the desired fluid loss control. Therefore, it is not necessary for the treatment fluid to include other additives to achieve the desired fluid loss control. It is also to be understood that any discussion related to a "test treatment fluid" is included for purposes of demonstrating that while the treatment fluid being introduced into a wellbore may contain other ingredients, it is the lost-circulation package that provides the desired fluid loss control. Therefore, while it may not be possible to perform a test in a wellbore for the specific treatment fluid being introduced, one can formulate a test treatment fluid to be tested in a laboratory to identify if the ingredients and concentration of the ingredients will provide the desired fluid loss control.

The treatment fluid can also contain other ingredients, such as a viscosifier; a filtration control agent; a shale stabilizer; a weighting agent; a pH buffer; an emulsifier; an emulsifier activator (e.g., lime); a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and any combination thereof.

The treatment fluid can have desirable properties that can affect the pumpability and suspending capability of the fluid. The treatment fluid can have a plastic viscosity in the range of 10 to 120 centipoise (cP), or 20 to 70 cP at a temperature of 120° F. (82.2° C.). The plastic viscosity can also be in a range such that the treatment fluid is pumpable. The treatment fluid can have a yield point in the range of 8 to 80 pounds per 100 sq. ft. (lb/100 ft$^2$) at a temperature of 120° F. (82.2° C.). The treatment fluid can also have a yield point in a range such that insoluble materials are suspended in the base fluid.

The methods can include mixing the base fluid and the lost-circulation package together. According to any of the embodiments, the methods include the step of introducing the treatment fluid into a subterranean formation. The subterranean formation can be penetrated by a wellbore. The well can be an oil, gas, or water production well, a geothermal well, or an injection well. The well can be an on-shore well or an off-shore well. The well includes the wellbore. The subterranean formation can be part of a reservoir or adjacent to a reservoir. The step of introducing the treatment fluid can be a drilling fluid for the purpose of drilling the wellbore. The drilling fluid can be in a pumpable state before and during introduction into the subterranean formation. The drilling fluid can be pumped through a drill bit or through other components such as open-ended components or through a bypass sub. The well can include an annulus. The step of introducing the treatment fluid can include introducing the treatment fluid into a portion of the annulus. The treatment fluid can also be a spacer fluid, a workover fluid, or a stimulation fluid. The methods can also include introducing one or more additional fluids before and/or after the step of introducing the treatment fluid.

The methods can include causing or allowing the lost-circulation material to reduce loss of the base fluid into permeable areas of the subterranean formation. The methods can include causing or allowing the treatment fluid to form a plug in the permeable areas of the subterranean formation.

An embodiment of the present disclosure is a treatment fluid comprising: a base fluid; and a lost-circulation package comprising: (i) a first lost-circulation material, wherein the first lost-circulation material is a plurality of pieces of an open-cell, natural or biodegradable material; and (ii) a second lost-circulation material. Optionally, the treatment fluid further comprises wherein the first lost-circulation material is a sponge. Optionally, the treatment fluid further comprises wherein the plurality of pieces are selected from open-cell, natural materials selected from the group consisting of cellulose, cellulose derivatives, hemicellulose, pectin, lignin, and combinations thereof. Optionally, the treatment fluid further comprises wherein the plurality of pieces are selected from open-cell, biodegradable materials selected from a biodegradable polymer foam, and wherein the biodegradable polymer is selected from polylactic acid, polyglycolic acid, or polyester. Optionally, the treatment fluid further comprises wherein the first lost-circulation material is natural loofah. Optionally, the treatment fluid further comprises wherein the plurality of pieces of the first lost-circulation material have a geometric shape selected from the group consisting of a sphere, a pyramid, a cube, a cylinder, a tetrahedron, a rectangular prism, a triangular prism, and any combination thereof. Optionally, the treatment fluid further comprises wherein the plurality of pieces of the first lost-circulation material have a largest dimension in the range of 0.1 to 2 inches. Optionally, the treatment fluid further comprises wherein the first lost-circulation material is in a concentration in the range of 0.1 to 10 pounds per barrel of the base fluid. Optionally, the treatment fluid further comprises wherein the second lost-circulation material comprises particles that are insoluble in the base fluid. Optionally, the treatment fluid further comprises wherein the particles are selected from the group consisting of ground coal, petroleum coke, sized calcium carbonate, asphaltene, perlite, cellophane, cellulose, ground tire material, ground oyster shell, vitrified shale, a plastic material, paper fiber, wood, cement, hardened foamed cement, glass, foamed glass, sand, bauxite, a ceramic material, a polymeric material, a polytetrafluoroethylene material, ground nut shells, ground seed shells, ground fruit pits, clay, silica, alumina, fumed carbon, carbon black, graphite, mica, titanium oxide, meta-silicate, calcium silicate, kaolin, talc, zirconia, boron, fly ash, a hollow glass microsphere, fibers, and any combination thereof. Optionally, the treatment fluid further comprises wherein the second lost-circulation material comprises ingredients that chemically react to form a cementitious substance in the presence of water. Optionally, the treatment fluid further comprises wherein the ingredients are selected from the group consisting of diatomaceous earth, lime, silica, clay, and combinations thereof. Optionally, the treatment fluid further comprises wherein the second lost-circulation material is in a concentration in the range of 10 to 200 pounds per barrel of the base fluid. Optionally, the treatment fluid further comprises wherein the second lost-circulation material is a natural or biodegradable material. Optionally, the treatment fluid further comprises wherein the lost-circulation package provides a desired fluid loss control, and wherein a desired fluid loss control is at least 70% by volume of the base fluid is not lost through permeable areas of a subterranean formation.

Another embodiment of the present disclosure is a method of treating a subterranean formation comprising: introducing a treatment fluid into the subterranean formation, the treatment fluid comprising: a base fluid; and a lost-circulation package comprising: (i) a first lost-circulation material, wherein the first lost-circulation material is a plurality of pieces of an open-cell, natural or biodegradable material; and (ii) a second lost-circulation material, wherein a test treatment fluid forms a plug in a slot that has a width of at least 1,000 micrometers and maintains a pressure differential of at least 1,000 psi. Optionally, the method further comprises wherein the first lost-circulation material is a sponge. Optionally, the method further comprises wherein the plurality of pieces are selected from open-cell, natural materials selected from the group consisting of cellulose, cellulose derivatives, hemicellulose, pectin, lignin, and combinations thereof. Optionally, the method further comprises wherein the plurality of pieces are selected from open-cell, biodegradable materials selected from a biodegradable polymer foam, and wherein the biodegradable polymer is selected from polylactic acid, polyglycolic acid, or polyester. Optionally, the method further comprises wherein the first lost-circulation material is natural loofah. Optionally, the method further comprises wherein the plurality of pieces of the first lost-circulation material have a geometric shape selected from the group consisting of a sphere, a pyramid, a cube, a cylinder, a tetrahedron, a rectangular prism, a triangular prism, and any combination thereof. Optionally, the method further comprises wherein the plurality of pieces of the first lost-circulation material have a largest dimension in the range of 0.1 to 2 inches. Optionally, the method further comprises wherein the first lost-circulation material is in a concentration in the range of 0.1 to 10 pounds per barrel of the base fluid. Optionally, the method further comprises wherein the second lost-circulation material comprises particles that are insoluble in the base fluid. Optionally, the method further comprises wherein the particles are selected from the group consisting of ground coal, petroleum coke, sized calcium carbonate, asphaltene, perlite, cellophane, cellulose, ground tire material, ground oyster shell, vitrified shale, a plastic material, paper fiber, wood, cement, hardened foamed cement, glass, foamed glass, sand, bauxite, a ceramic material, a polymeric material, a polytetrafluoroethylene material, ground nut shells, ground seed shells, ground fruit pits, clay, silica, alumina, fumed carbon, carbon black, graphite, mica, titanium oxide, meta-silicate, calcium silicate, kaolin, talc, zirconia, boron, fly ash, a hollow glass microsphere, fibers, and any combination thereof. Optionally, the method further comprises wherein the second lost-circulation material comprises ingredients that chemically react to form a cementitious substance in the presence of water. Optionally, the method further comprises wherein the ingredients are selected from the group consisting of diatomaceous earth, lime, silica, clay, and combinations thereof. Optionally, the method further comprises wherein the second lost-circulation material is in a concentration in the range of 10 to 200 pounds per barrel of the base fluid. Optionally, the method further comprises wherein the second lost-circulation material is a natural or biodegradable material. Optionally, the method further comprises wherein the lost-circulation package provides a desired fluid loss control, and wherein a desired fluid loss control is at least 70% by volume of the base fluid is not lost through permeable areas of a subterranean formation. Optionally, the method further comprises causing or allowing the treatment fluid to form a plug in one or more permeable areas of the subterranean formation.

The exemplary treatment fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore drilling assembly 100. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure. It should also be noted that while FIG. 1 and the discussion of the figure is for a drilling operation and fluid, other types of treatment fluids, such as spacer fluids, workover fluids, and stimulation fluids can be used with the disclosed equipment.

As illustrated, the drilling assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

One or more additional fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments; however, the additional fluids can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128 which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the disclosed fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, PDC bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

Examples

To facilitate a better understanding of the various embodiments, the following examples are given.

As used herein, a "fracture plugging test" of a test treatment fluid is tested according to the hesitation squeeze method at a specified temperature and pressure differential as follows. The base fluid of the test fluid is mixed with any ingredients, such as a weighting agent and the lost-circulation materials, in a low shear mixer at a high enough revolutions per minute (rpm) such that a vortex of approximately 0.5 inches (in.) is created for 5 minutes (min.). The test fluid is then poured into a standard permeability plugging apparatus (PPA) test cell equipped with a pipe plug in lieu of a rupture disc in the floating piston. An appropriately sized disk and the LCM evaluation receiver are placed on the test cell. A vug/slot adapter can be used in place of the LCM Cell Cap Assembly. If the slot being used in testing is greater than 6,000 micrometers, then the vug/slot adapter must be used. A hose is attached from the top of the collection vessel to a beaker to collect filtrate coming out of the top of the test cell. A manual hydraulic pump is attached to the test cell. The cell is primed with the pump, so the test fluid is located just below the slot.

Initial sealing of the test cell is performed by applying pressure across the slot with the pump at a rate of 2 to 4 seconds per complete stroke for 3 strokes. Cease applying pressure with the pump for 60 seconds (sec.). Repeat the process 10 times. The amount of pressure across the slot can be increased as follows: pump slowly at 2 to 4 sec. per stroke for 10 strokes without letting the pressure go above 250 pounds force per square inch (psi) by slowing down the stroke speed if necessary each time; wait for 60 sec.; repeat this process 3 times. During the steps of increasing the pressure, some filtrate should start to come out of the top of the collection cell and if the pressure does not return back to near to zero then the LCM has completely de-watered, and the fracture has been plugged. If possible, continue to increase the pressure by pumping slowly at 2 to 4 sec. per stroke up to 500 psi and wait for 60 sec., then up to 1,000 psi and wait 60 sec., then in additional 1,000 psi increments until the formed plug can no longer hold the pressure as would be seen with a drop in pressure.

Various test fluids were tested for plug formation at a temperature of 75° F. (24° C.) across a slot having a diameter of 8,000 micrometers (μm). Each of the test fluids contained a base fluid of deionized water and 100 pounds per barrel (ppb) of a cementitious lost-circulation material. Pieces of either a synthetic, open-cell, polyurethane foam (test fluid #2) or natural loofah (test fluids 3-5) were included in the test fluids. The type of pieces, concentration, shape, and results from the plug formation testing are shown in Table 1 below.

TABLE 1

| Fluid # | Type of Pieces | Concentration of Pieces (ppb) | Shape of Pieces | Results |
| --- | --- | --- | --- | --- |
| 1 | — | — | — | Failed to form a plug |
| 2 | Synthetic | 0.25 | Pyramid | Plugged and held at 3,000 psi |
| 3 | Loofah | 0.25 | Pyramid | Failed to form a plug |
| 4 | Loofah | 0.5 | Pyramid | Plugged and held at 3,000 psi |
| 5 | Loofah | 0.5 | Cuboid | Plugged and held at 3,000 psi |

Figure 4A:
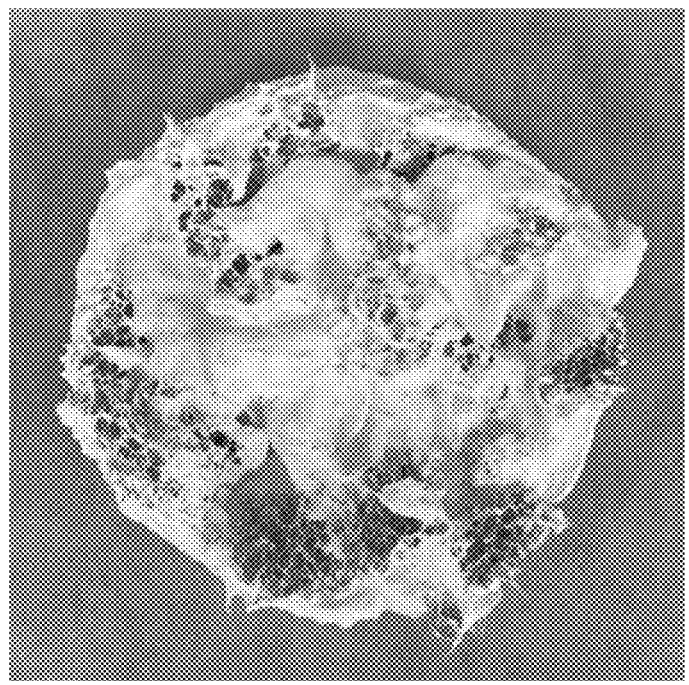
FIG. 4A is a top view of a lost-circulation material plug according to certain embodiments.
Figure 4B:
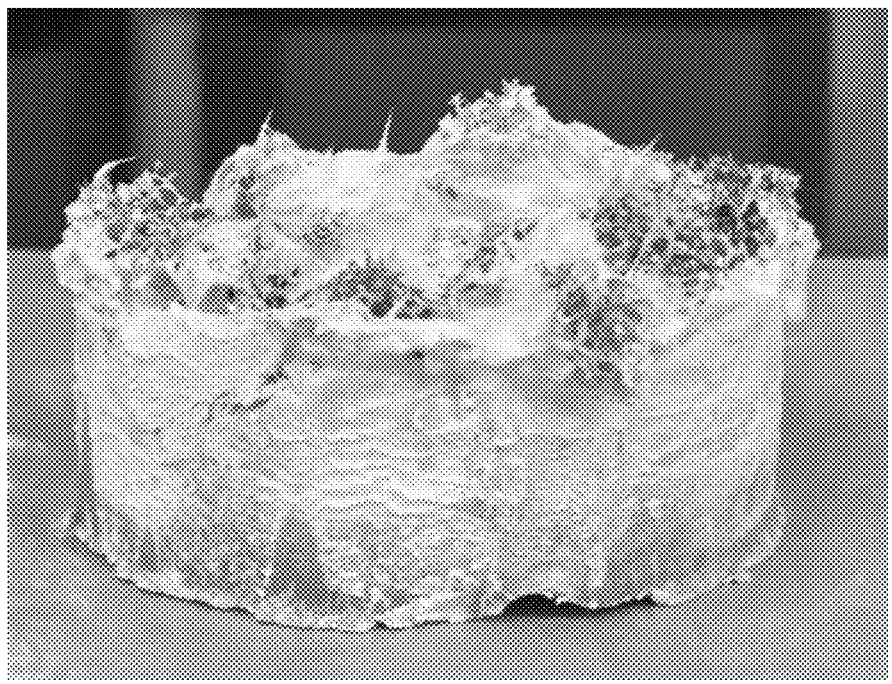
FIG. 4B is a side view of FIG. 4A.
Figure 5A:
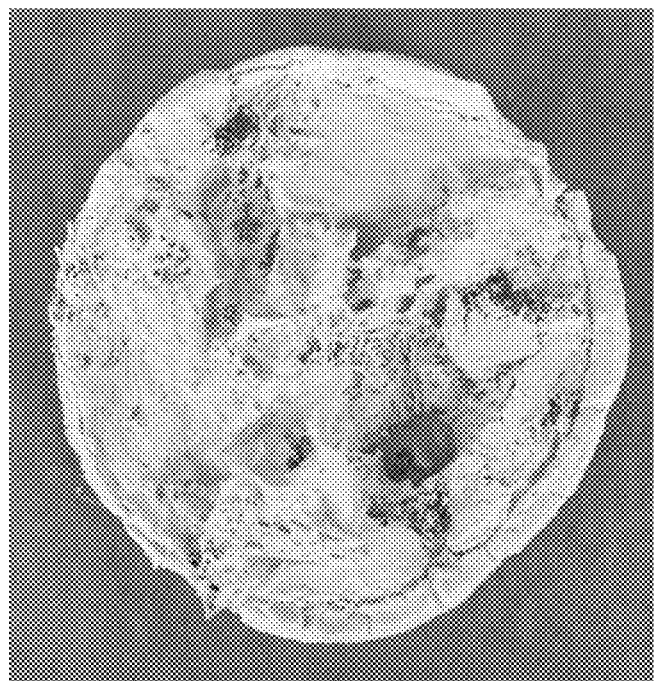
FIG. 5A is a top view of a lost-circulation material plug according to certain other embodiments.
Figure 5B:
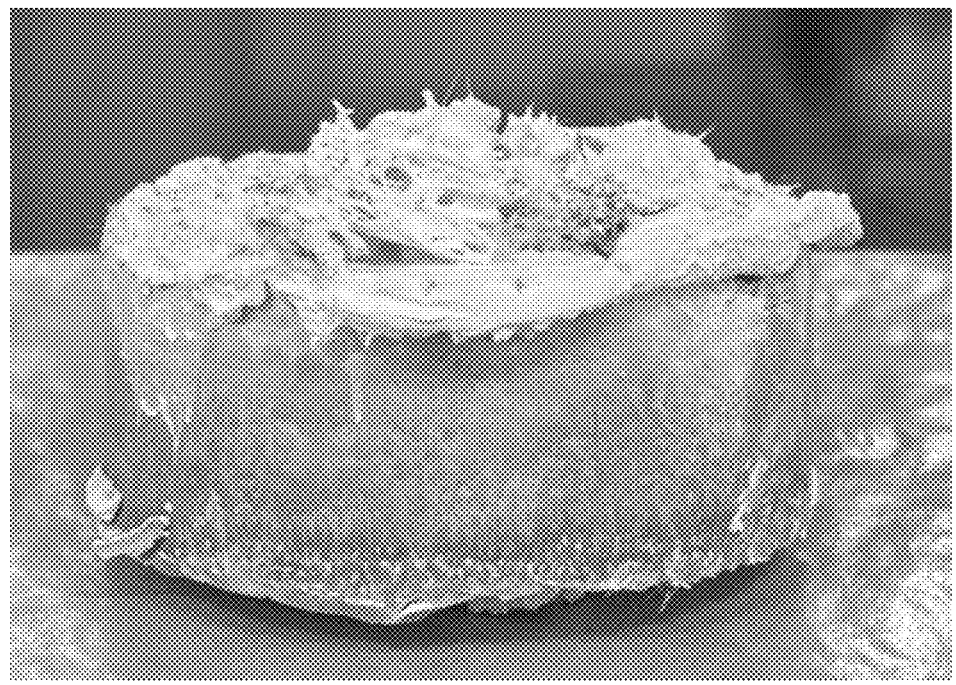
FIG. 5B is a side view of FIG. 5A.

FIGS. 4A and 4B show the plug that was formed for fluid #2 with synthetic foam pieces as the first lost-circulation material. As noted above, these synthetic foam pieces may not be used depending on the environmental regulations imposed at the well site. FIGS. 5A and 5B show the plug that was formed for fluid #4 with natural loofah pieces as the first lost-circulation material. As can be seen in Table 1 and FIGS. 4A-5B, fluid #1 that only contained the cementitious lost-circulation material did not form a plug and did not control lost circulation of the base fluid. However, by adding a plurality of foam pieces to the cementitious lost-circulation material, most of the other fluids formed a plug and held pressure up to 3,000 psi, which was the maximum pressure tested.

As can also be seen, a concentration of 0.25 ppb of the natural loofah was not sufficient to form a plug. However, at a concentration of 0.5 ppb, a plug was formed and held pressure up to 3,000 psi. Moreover, both pyramid and cuboid shaped natural loofah pieces formed a plug that held pressure up to 3,000 psi. This indicates that the concentration and geometric shapes of the plurality of pieces of the first lost-circulation material can be selected to form a plug and provide the desired fluid loss control. Accordingly, the LCM package should perform well under any wellbore pressures and sizes of permeable areas encountered.

Therefore, the various embodiments are well adapted to attain the ends and advantages mentioned as well as those that are inherent therein. The particular embodiments disclosed above are illustrative only, as the various embodiments may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more lost-circulation materials, etc., as the case may be, and do not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A treatment fluid comprising:
a base fluid; and
a lost-circulation package consisting of:
   (i) a first lost-circulation material, wherein the first lost-circulation material is a plurality of pieces, wherein each one of the plurality of pieces consist of an open-cell framework made from a natural or biodegradable material, wherein the open-cell framework comprises multiple interconnected pores that allow a fluid to flow through the interconnected pores, and wherein each one of the plurality of pieces have a geometric shape selected from the group consisting of a sphere, a pyramid, a cube, a cylinder, a tetrahedron, a rectangular prism, a triangular prism, and any combination thereof; and
   (ii) a second lost-circulation material, wherein the second lost-circulation material is two or more ingredients that chemically react to form a cementitious substance in the presence of water, or is a combination of two or more ingredients that chemically react to form a cementitious substance in the presence of water and insoluble particles.

2. The treatment fluid according to claim 1, wherein the first lost-circulation material is a sponge.

3. The treatment fluid according to claim 1, wherein the natural material is selected from the group consisting of cellulose, cellulose derivatives, hemicellulose, pectin, lignin, and combinations thereof.

4. The treatment fluid according to claim 1, wherein the biodegradable material is selected from a biodegradable polymer foam, and wherein the biodegradable polymer is selected from polylactic acid, polyglycolic acid, or polyester.

5. The treatment fluid according to claim 1, wherein the first lost-circulation material is natural loofah.

6. The treatment fluid according to claim 1, wherein the plurality of pieces have a largest dimension in the range of 0.1 to 2 inches.

7. The treatment fluid according to claim 1, wherein the first lost-circulation material is in a concentration in the range of 0.1 to 10 pounds per barrel of the base fluid.

8. The treatment fluid according to claim 1, wherein the insoluble particles are selected from the group consisting of ground coal, petroleum coke, sized calcium carbonate, asphaltene, perlite, cellophane, cellulose, ground tire material, ground oyster shell, vitrified shale, a plastic material, paper fiber, wood, cement, hardened foamed cement, glass, foamed glass, sand, bauxite, a ceramic material, a polymeric material, a polytetrafluoroethylene material, ground nut shells, ground seed shells, ground fruit pits, clay, silica, alumina, fumed carbon, carbon black, graphite, mica, titanium oxide, meta-silicate, calcium silicate, kaolin, talc, zirconia, boron, fly ash, a hollow glass microsphere, fibers, and any combination thereof.

9. The treatment fluid according to claim 1, wherein the two or more ingredients are selected from the group consisting of diatomaceous earth, lime, silica, clay, and combinations thereof.

10. The treatment fluid according to claim 1, wherein the second lost-circulation material is in a concentration in the range of 10 to 200 pounds per barrel of the base fluid.

11. The treatment fluid according to claim 1, wherein the second lost-circulation material is a natural or biodegradable material.

12. The treatment fluid according to claim 1, wherein the lost-circulation package provides a desired fluid loss control, and wherein a desired fluid loss control is at least 70% by volume of the base fluid is not lost through permeable areas of a subterranean formation.

13. A method of treating a subterranean formation comprising:
   introducing a treatment fluid into the subterranean formation, the treatment fluid comprising:
      a base fluid; and
      a lost-circulation package consisting of:
         (i) a first lost-circulation material, wherein the first lost-circulation material is a plurality of pieces, wherein each one of the plurality of pieces consist of an open-cell framework made from a natural or biodegradable material, wherein the open-cell framework comprises multiple interconnected pores that allow a fluid to flow through the interconnected pores, and wherein each one of the plurality of pieces have a geometric shape selected from the group consisting of a sphere, a pyramid, a cube, a cylinder, a tetrahedron, a rectangular prism, a triangular prism, and any combination thereof; and
         (ii) a second lost-circulation material, wherein the second lost-circulation material is two or more ingredients that chemically react to form a cementitious substance in the presence of water, or is a combination of two or more ingredients that chemically react to form a cementitious substance in the presence of water and insoluble particles,
   wherein a test treatment fluid forms a plug in a slot that has a width of at least 1,000 micrometers and maintains a pressure differential of at least 1,000 psi.

14. The method according to claim 13, wherein the first lost-circulation material is a sponge.

15. The method according to claim 13, wherein the natural material is selected from the group consisting of cellulose, cellulose derivatives, hemicellulose, pectin, lignin, and combinations thereof.

16. The method according to claim 13, wherein the biodegradable material is selected from a biodegradable polymer foam, and wherein the biodegradable polymer is selected from polylactic acid, polyglycolic acid, or polyester.

17. The method according to claim 13, further comprising causing or allowing the treatment fluid to form a plug in one or more permeable areas of the subterranean formation.

18. The method according to claim 13, wherein the two or more ingredients are selected from the group consisting of diatomaceous earth, lime, silica, clay, and combinations thereof.

19. The method according to claim 13, wherein the insoluble particles are selected from the group consisting of ground coal, petroleum coke, sized calcium carbonate, asphaltene, perlite, cellophane, cellulose, ground tire material, ground oyster shell, vitrified shale, a plastic material, paper fiber, wood, cement, hardened foamed cement, glass, foamed glass, sand, bauxite, a ceramic material, a polymeric material, a polytetrafluoroethylene material, ground nut shells, ground seed shells, ground fruit pits, clay, silica, alumina, fumed carbon, carbon black, graphite, mica, titanium oxide, meta-silicate, calcium silicate, kaolin, talc, zirconia, boron, fly ash, a hollow glass microsphere, fibers, and any combination thereof.

* * * * *